United States Patent
Fung

(10) Patent No.: US 11,113,974 B1
(45) Date of Patent: Sep. 7, 2021

(54) SYSTEM AND METHOD FOR AUTOMATED ROUTING OF MASS TRANSIT VEHICLES

(71) Applicant: PANTONIUM INC., Toronto (CA)

(72) Inventor: Khun Yee Fung, King City (CA)

(73) Assignee: PANTONIUM INC., Toronto (CA)

( * ) Notice: Subject to any disclaimer, the term of this patent is extended or adjusted under 35 U.S.C. 154(b) by 0 days.

(21) Appl. No.: 17/107,010

(22) Filed: Nov. 30, 2020

(51) Int. Cl.
- *G08G 1/00* (2006.01)
- *G01C 21/34* (2006.01)
- *G08G 1/123* (2006.01)
- *G01C 21/36* (2006.01)

(52) U.S. Cl.
CPC ......... *G08G 1/202* (2013.01); *G01C 21/3415* (2013.01); *G01C 21/3438* (2013.01); *G01C 21/3605* (2013.01); *G08G 1/123* (2013.01)

(58) Field of Classification Search
CPC .... G08G 1/202; G08G 1/123; G01C 21/3438; G01C 21/3415; G01C 21/3605
See application file for complete search history.

(56) References Cited

U.S. PATENT DOCUMENTS 10,458,802 B2 * 10/2019 Marco .................. G06Q 10/04

* cited by examiner

*Primary Examiner* — Michael V Kerrigan
(74) *Attorney, Agent, or Firm* — Bhole IP Law; Anil Bhole; Marc Lampert

(57) ABSTRACT

A computer implemented system and method for routing a vehicle. The method includes establishing, in a computer memory, a set of parameters comprising a plurality of hub stops and a threshold time, receiving a service request comprising a service location, determining a current location of the vehicle, determining an upcoming travel time for the vehicle to travel from the current location to the service location, and determining, via a processor, a next stop for the vehicle selected from: if the upcoming travel time does not exceed the threshold time, the service location; and if the upcoming travel time exceeds the threshold time, one of the plurality of hub stops.

16 Claims, 4 Drawing Sheets

C = Current Stop
U = Upcoming Stop
W = Waypoint
T = Threshold Time
UTT = Upcoming Travel Time
RTT = Residue Travel Time
WT = Waytime
MP = Minimum Progress
UTT > T
WT > MWT
UTT - RTT > MP

SYSTEM AND METHOD FOR AUTOMATED ROUTING OF MASS TRANSIT VEHICLES

TECHNICAL FIELD

The following relates generally to computer implemented vehicle routing and more specifically to routing of mass transit vehicles.

BACKGROUND

Mass public transportation systems have existed in essentially the same form for over a century. Generally, for any particular jurisdiction, a government controlled central authority balances population, the economy, traffic, demand, taxation, quality of life and other factors to define a fixed set of fixed vehicle routes. These vehicles include buses, trains, subways, trams and other forms of mass transit. This results in a scheduled transportation service wherein vehicles travel from location to location at scheduled times.

Recently, the proliferation of smart devices (particularly smartphones) among civilians has enabled private companies to deploy responsive and efficient private transportation. Some services have also privatized vehicle pooling, with the number of passengers served by a vehicle generally in the range of 1 to 7. Algorithms define how the vehicles are routed to best deliver the passengers to their respective destinations within a minimal time or cost constraint. This results in an on-demand transportation service wherein vehicles travel from location to location based solely on requests. However, passenger requests that are established during the course of an existing trip are handled manually, by the driver of the existing trip interacting with his or her device to accept the trip. This results in an unsafe practice. Further the vehicles servicing these requests generally compete for passengers and provision of services within any particular geographic area follows principles of supply and demand only, making these most suitable to private and not public offering.

Scaling on-demand transportation services to mass transport, where a particular vehicle may be serving tens or potentially hundreds of passengers within a short timeframe, is a complex problem that cannot reasonably be accomplished by manual planning techniques. Additionally, where mass transport is provided as a public benefit, the geographical scope of service is generally not intended to correspond directly with demand but must take into account other factors.

SUMMARY

In an aspect, a computer implemented method for routing a vehicle is provided, the method comprising: establishing, in a computer memory, a set of parameters comprising a plurality of hub stops and a threshold time; receiving a service request comprising a service location; determining a current location of the vehicle; determining an upcoming travel time for the vehicle to travel from the current location to the service location; and determining, via a processor, a next stop for the vehicle selected from: if the upcoming travel time does not exceed the threshold time, the service location; and if the upcoming travel time exceeds the threshold time, one of the plurality of hub stops.

In embodiments, the set of parameters further comprises a minimum allowed waytime and a minimum progress, and wherein selecting one of the plurality of hub stops comprises: generating a first subset of hub stops for which travel time from the current location and the respective hub stop is greater than the minimum allowed waytime; generating a second subset of hub stops for which the difference between upcoming travel time and travel time between each respective hub stop and the service location is greater than the minimum progress; generating a third subset of hub stops for which travel time between the current location of the vehicle and each respective hub stop is less than the threshold time; and selecting a hub stop occurring within each one of the first subset second subset and third subset.

In embodiments, if more than one of the plurality of hub stops occurs within each one of the first subset second subset and third subset, selecting one of the plurality of hub stops further comprises selecting the hub stop having the least travel time from the current location and the respective hub stop.

In embodiments, if more than one of the plurality of hub stops occurs within each one of the first subset second subset and third subset, selecting one of the plurality of hub stops further comprises selecting the hub stop having the greatest travel time from the current location and the respective hub stop.

In embodiments, if more than one of the plurality of hub stops occurs within each one of the first subset second subset and third subset, selecting one of the plurality of hub stops further comprises selecting the hub stop randomly or pseudorandomly.

In embodiments, if more than one of the plurality of hub stops occurs within each one of the first subset second subset and third subset, selecting one of the plurality of hub stops further comprises selecting the hub stop having the least travel time from the respective hub stop to the service location.

In embodiments, if more than one of the plurality of hub stops occurs within each one of the first subset, second subset and third subset, selecting one of the plurality of hub stops further comprises selecting the hub stop with the shortest combined travel time from the current location and the respective hub stop, and the travel time between the respective hub stop and the service location.

In embodiments, if more than one of the plurality of hub stops occurs within each one of the first subset, second subset and third subset, selecting one of the plurality of hub stops further comprises selecting the hub stop with the greatest combined travel time from the current location and the respective hub stop, and the travel time between the respective hub stop and the service location.

In embodiments, the service request further comprises a requested time to service the service location, the requested time being contemporaneous with receiving the service request.

In embodiments, the service request further comprises a requested time to service the service location, the requested time being in the future relative to receiving the service request.

In embodiments, the routing component periodically evaluates the service request until such time as servicing the service request results in a route arriving at the service location at approximately the requested time.

In embodiments, the service location is a pickup location and the service request further comprises a dropoff location and a pickup time.

In embodiments, the service location is a dropoff location and the service request further comprises a pickup location and a dropoff time.

In embodiments, the service request is provided via a service requesting device.

In embodiments, the service requesting device is a mobile device operated by a requesting passenger.

In embodiments, upon a cancellation of the service request, the routing component directs the vehicle to continue to the next stop, removes the service location from the vehicle's route and thereafter reroutes the vehicle based on additional service requests.

These and other aspects are contemplated and described herein. It will be appreciated that the foregoing summary sets out representative aspects of embodiments to assist skilled readers in understanding the following detailed description.

DESCRIPTION OF THE DRAWINGS

A greater understanding of the embodiments will be had with reference to the Figures, in which.

DETAILED DESCRIPTION

Figure 1:
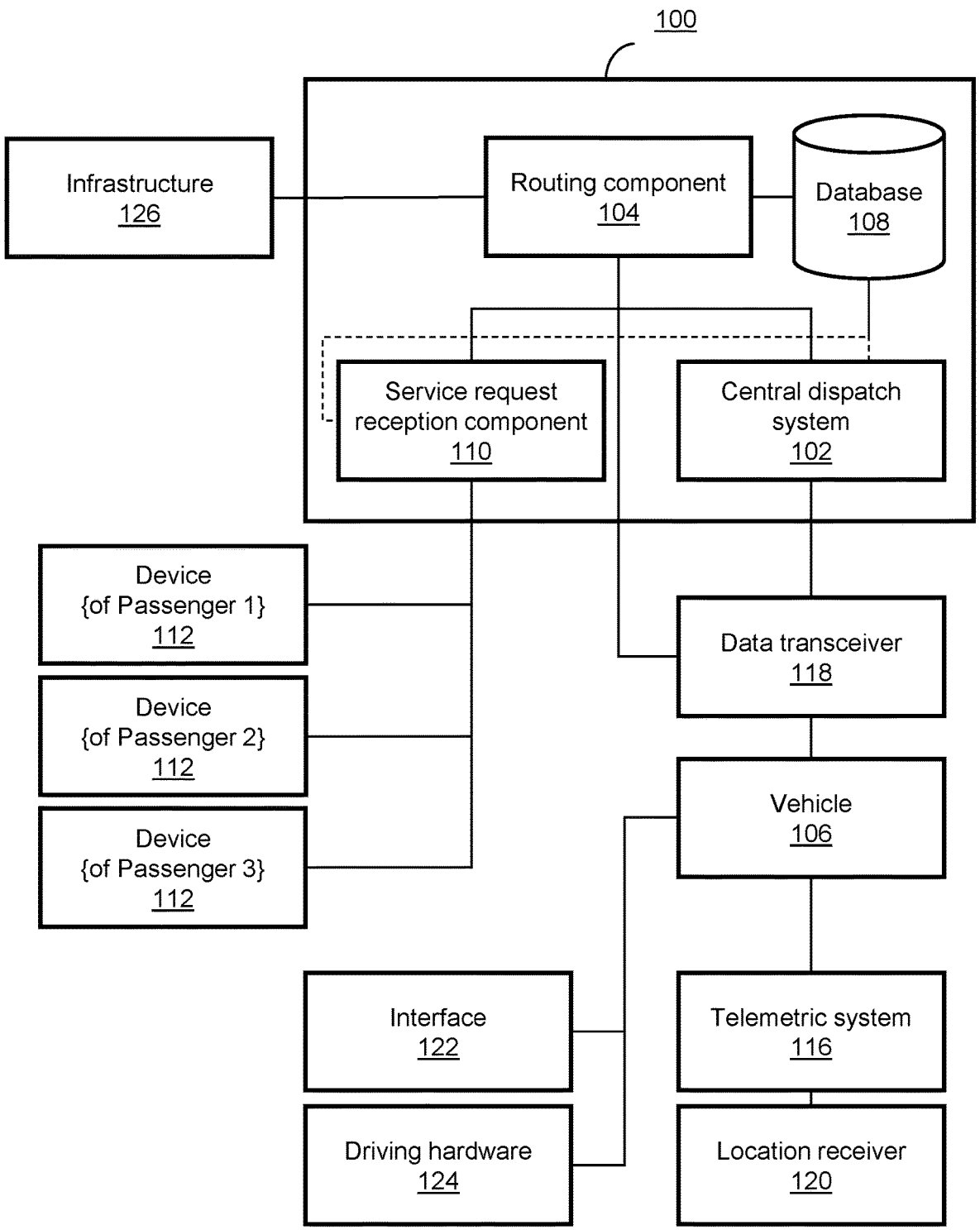
FIG. 1 is a schematic diagram of a system for automated routing of mass transit vehicles, in accordance with an embodiment.

Embodiments will now be described with reference to the figures. For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

Embodiments of the present disclosure provide a system and method for automated routing of mass transit vehicles. The system is configured to dynamically route mass transit vehicles to serve many passenger requests per vehicle in short timeframes for the purposes of optimally providing dynamic, on-demand transit services. Preferred embodiments are implemented within fully on-demand implementations wherein vehicles are not required to travel along any fixed route, at least during specific times or in specific geographical areas if not fully. However, in alternative embodiments, the system can be configured to augment service for a generally fixed-route implementation, wherein vehicles are permitted to deviate from such fixed routes. The latter will be referred to herein as "deviated route" implementations.

The present system and method improve efficiency of providing transportation services in large geographical areas which can help mitigate delays when demand for transportation services changes while vehicles are travelling long distances and which does not require any physical interaction (other than merely visual interaction) between the driver and a device providing route guidance while the driver is operating the vehicle. In particular, in preferred embodiments there is no need for a driver to physically touch or provide any other type of active command to affect any functionality of the system and at most the driver, while driving, merely needs to be a passive consumer of navigation information provided by the system.

Providing efficient transportation services in large geographical areas can be challenging given that in the time for one vehicle to drive from one location to the other within the area, changes in transportation demand can occur. Applicant has now determined that it may be more efficient in such cases for the vehicle to alter its route. However, it is a challenge to alter such routes in a manner that optimizes overall efficiency of the vehicle amongst the needs of the passengers. This is particularly challenging for transportation providers who need to provide transportation services in areas which cover both rural and urban zones which are unique in that in urban zones, stops are typically close together, whereas in rural zones stops are typically much further apart. Another example of a challenging case is in strictly urban zones where density and thereby transportation demand may be uneven, leading to a potential need to transport a single passenger from a low-density area to another within the zone.

However, depending on the nature of the vehicle providing transportation services it may not be possible for it to turn around or alter its route without adding additional delays. In addition, in many jurisdictions (e.g., several jurisdictions within North America) it is not legal for drivers to actively interact with (e.g., provide commands to) devices while operating a vehicle which may be necessary if route guidance requires a driver to alter their route.

The system and method described herein can be utilized to overcome these issues.

Referring first to FIG. 1, a schematic diagram of a system 100 for automated routing of mass transit vehicles, in accordance with an embodiment, is shown. The system comprises a computerized central dispatch system 102 which is communicatively linked to a routing component 104.

The routing component 104 is configured to define routes on which vehicles 106 are directed to travel. In deviated route implementations, initial or baseline routes may be pre-configured manually by an administrator; for example, transit planning groups. Note that FIG. 1 illustrates a single vehicle 106, however a person of skill would readily appreciate that the routing component may be linked by data transceivers 118 to a plurality of such vehicles 106, e.g., a fleet of transit vehicles.

The routing component 104 defines routes to be travelled by the vehicles 106 based on a combination of transportation demand (and, in deviated route implementations, any fixed scheduled stops which generally comprise a plurality of spaced apart stops along a directed route, and which may then be adjusted as demand for transportation changes).

A set of stops is pre-configured manually by the administrator. The administrator may further define other constraints. Examples include the definition of permissible addresses or address ranges at which a vehicle is permitted to stop regardless of whether such address is a transit stop (e.g., in a door-to-door service scenario). In a particular implementation, addresses may be defined by one or more virtual perimeters for the real-world geographic area within which addresses can be selected as stops.

In the present specification, the administrator may designate a subset of the stops as "hub stops". The remainder of the stops are defined as possible stops. The hub stops are specific locations (e.g., defined by a latitude and longitude) and are preferably chosen so that vehicles are able to safely stop and potentially turn around. The hub stops are preferably placed strategically within the service area such that they are not too far apart. The routing component dynamically assesses demand for the vehicle and, in response to servicing a particular passenger request, determines whether it is preferable to select a hub stop as a waypoint during a trip to service such request.

The routing component comprises or is communicatively linked to a database 108 storing a plurality of parameters in accordance with which deviations from the routes may be permitted. These parameters are discussed more fully with reference to FIG. 2.

Additionally, the routing component is communicatively linked to a service request reception component 110 which is configured to receive service requests from a plurality of passengers interacting with service requesting devices 112. The service request reception component 110 transmits these service requests to the routing component. If the routing component 104 is linked to a plurality of vehicles 106 then it determines to which particular vehicle to allocate the service request, using any of several known methods for doing so. The routing component dynamically determines a route for the particular vehicle in response to such service requests, and correspondingly directs the dispatch system to dispatch such vehicle accordingly.

The service request reception component 110 and/or central dispatch system 102 may be communicatively linked to the database 108 for storing and retrieving various data to enable functions both described herein and additional to those described herein.

Each vehicle 106 is equipped with telemetric systems 116 that permit the dispatch system 102 to determine current telemetric information of the vehicle 106. This information generally comprises at least the most recent known location (which can be considered its current location) of the vehicle 106 from which additional information may be determined, such as speed, direction of travel, and traffic congestion, for example. These telemetric systems may be provided by onboard integrated hardware or could be provided by use of a smartphone or other computer-based application with suitable hardware, such as a tablet with onboard data transceiver hardware 118 and a GPS or other location-based (signal triangulation, for example) receiver 120. The hardware may further comprise a display or other interface 122 to permit a driver of such vehicle to respond to routing decisions and/or the hardware 124 may be communicatively linked to the driving components of the vehicle in an autonomous or semi-autonomous vehicle implementation.

The telemetric systems 116 are configured to periodically transmit the telemetric information to the routing component 104 and are configured to receive routing instructions from the dispatch system 102. In short, the vehicles 106 can be considered "connected vehicles" in that at least the vehicle's current location is transmitted to the routing component 104 and there is some means to receive routing information in the vehicle 106.

The routing component 104 may obtain further information to the above to more accurately determine environmental conditions, for example from other infrastructure 126 unassociated with the vehicle, such as traffic sensors, traffic light data, accident information, road closure information, information databases containing service disruptions, etc. Additionally, the telemetric information may include on-vehicle sensors such as passenger counters, on-vehicle cameras, door sensors, farebox data or other relevant information that permits more contextual routing decisions. Furthermore, a person of skill in the art will appreciate that the routing component incorporates techniques to accurately estimate various information such as predicted travel time.

In the present system, passenger input is considered in routing decisions. In deviated route implementations, while particular passengers may utilize the mass transit service in a "traditional" manner; that is, without interacting directly with the dispatch system, at least some of the passengers in deviated route implementations and all of the passengers in the preferred embodiments having access to the mass transit service are in possession of a service requesting device 112.

A service requesting device 112 may include a mobile service request hardware such as a smartphone equipped with or without location-based receiver and an onboard data transceiver hardware. Other service requesting devices 112 may include passenger-owned computers for which the passenger has established an account with the transit provider and identified the location of the computer or some other location at which a pickup is requested, or a web interface in which the passenger manually provides location information for the request, or any telephone, mobile device or other communication service to permit the passenger to communicate with a person or automated system to provide input on their behalf which results in a service request being entered to the system. Service requesting device 112 may further include fixed service request hardware such as request buttons located at fixed locations outside of the vehicle (to request a pickup at a fixed location as soon as possible). Additionally, vehicle drivers or attendants may be provided with a service requesting device 112 to enter service requests contemporaneous with picking up passengers that happen to be physically hailing a vehicle without having made a prior service request. In deviated route implementations, service requesting device 112 may further include fixed service request hardware such as request buttons located at fixed locations inside of the vehicle (to request a next stop, as in these implementations existing on-board passengers may not be ones that initiated a service request prior to or contemporaneous with boarding the vehicle).

In embodiments of the present system, passenger requests may comprise a request for a pickup or drop off at a specific time in the future or contemporaneous with receiving the service request (i.e., for as soon as possible). As an example, a passenger could request a pickup at location A for time B (which can be as soon as possible or an approximated future time) with a drop off at location C, or could request a pickup at location X with a drop off at location Y for approximated future time Z. The methods described herein are capable of utilizing this information analogously to present-timed requests. For example, the routing component may periodically evaluate a future timed request (i.e., either at a predetermined frequency or continuously), to determine whether making a routing decision at any given time would be premature (i.e., resulting in service to such location occurring earlier than requested by the passenger) and retain the service request in an unserviced state for further consideration. When the routing component evaluated the future timed request and determines that servicing such request would result in arriving at the specified location at approximately the specified time, the routing component may then make a routing decision in accordance with the following.

Figure 2:
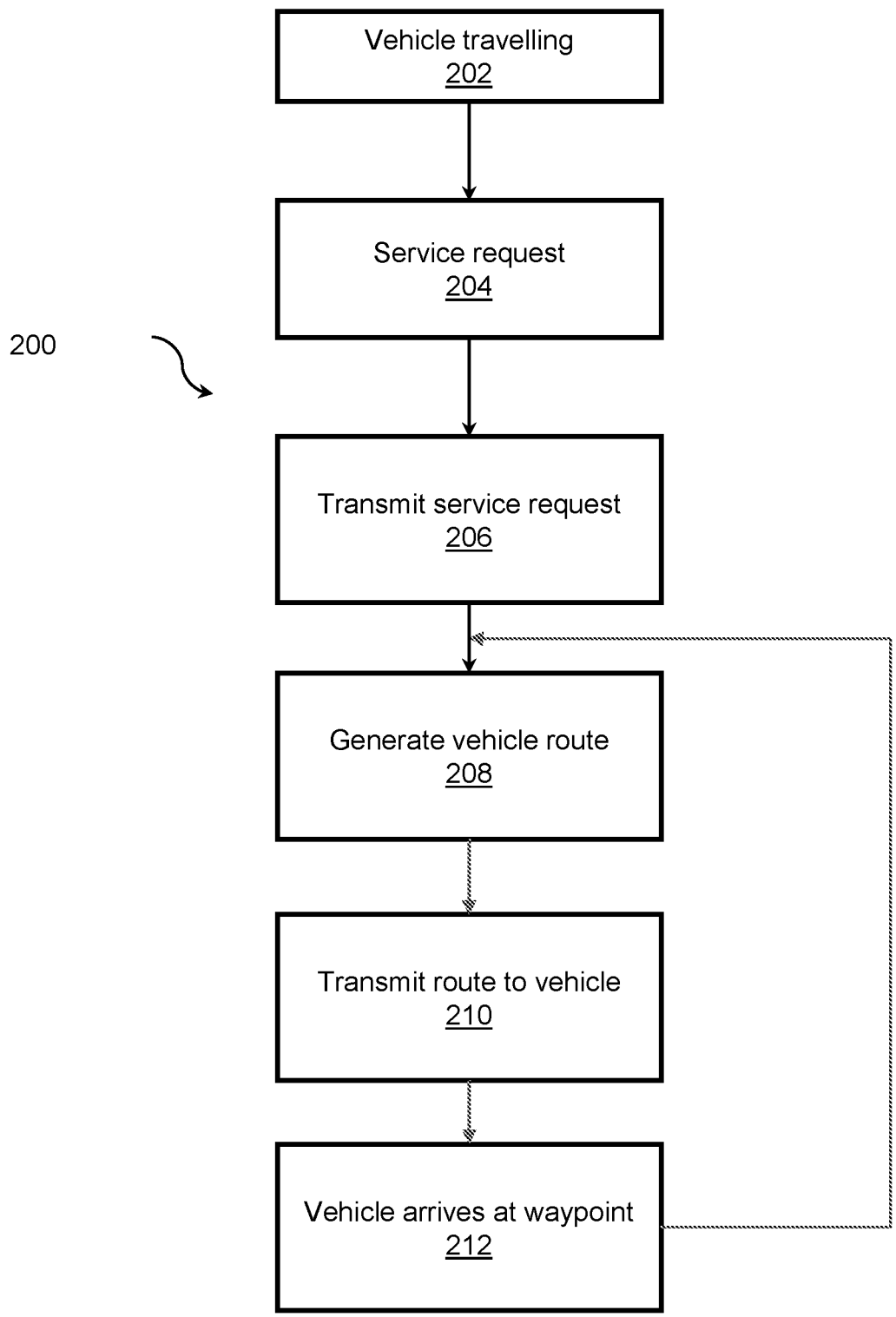
FIG. 2 is a flowchart illustrating a method for automated routing of mass transit vehicles.

Referring now to FIG. 2, a method 200 for automated routing of mass transit vehicles is shown. At block 202, in operation a particular vehicle is travelling on a route. The vehicle will travel from one stop to the next based on the stops allocated to that vehicle by the routing component 104, based on the service requests (and/or scheduled stops in a deviated route implementation). The vehicle may also stop in response to manual driver intervention (i.e., there is a person waiting at a stop) and that person can make a service request with the driver which will then be added to the vehicle's route.

At any given time, at block 204 a service request is made by a passenger by means of the service requesting device which identifies at least a pickup location, a drop off location and a time (the pickup or dropoff time, as appropriate). At block 206, the service requesting device transmits a signal to the dispatch system including at least the pickup location, drop off location and the time.

As described earlier, the administrator has defined particular stops as hub stops, and all other stops are defined as possible stops. The administrator also defines three parameters: threshold time, minimum allowed waytime, and minimum progress, each of which is more fully described below.

Upon the receipt of the service request, at block 208 the routing component generates a dynamic vehicle route within the constraints of the hub stops, possible stops, threshold time, minimum allowed waytime, and minimum progress.

Figure 3:
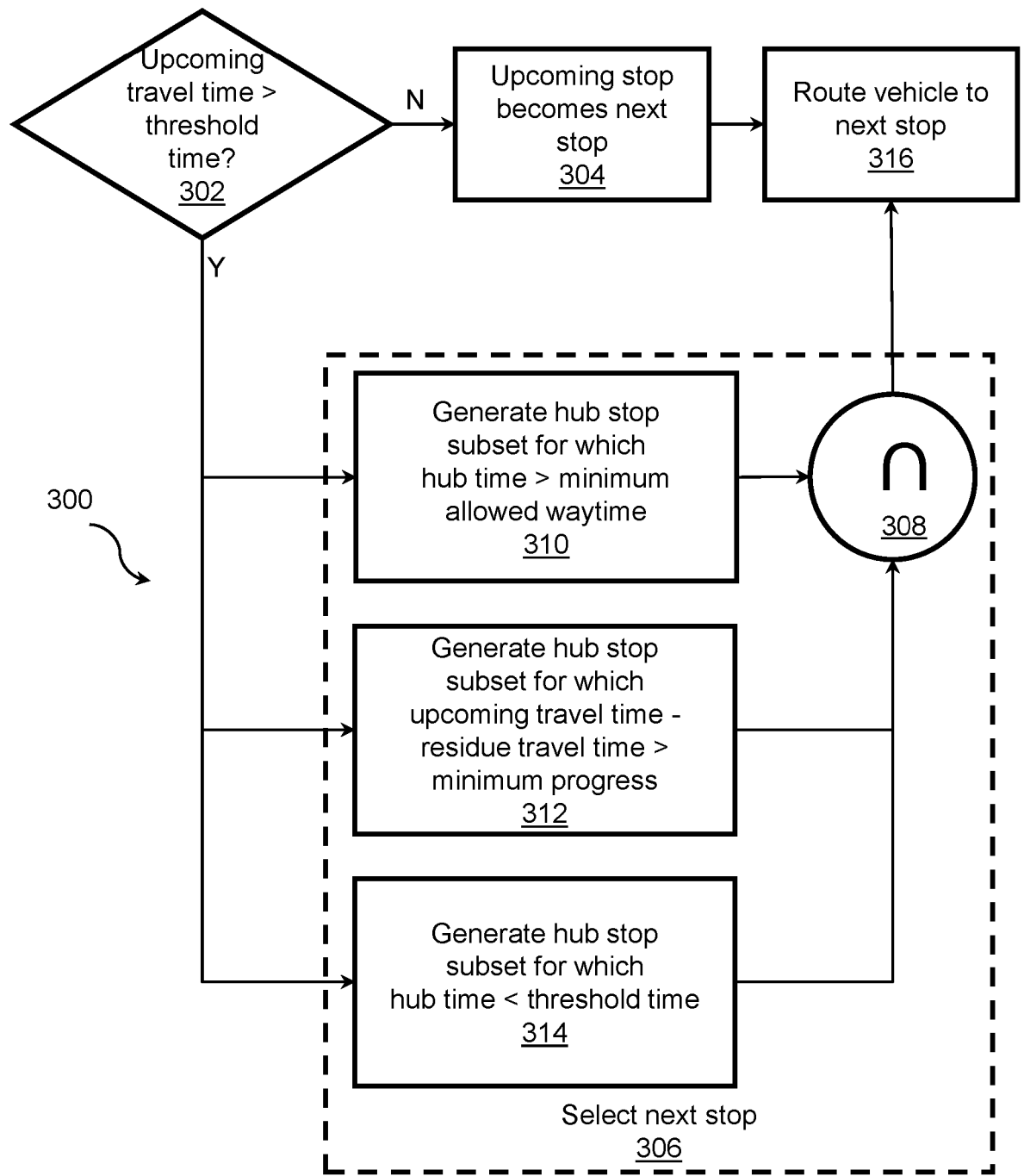
FIG. 3 is a flowchart illustrating a method for selecting a waypoint from amongst hub stops.
Figure 4:
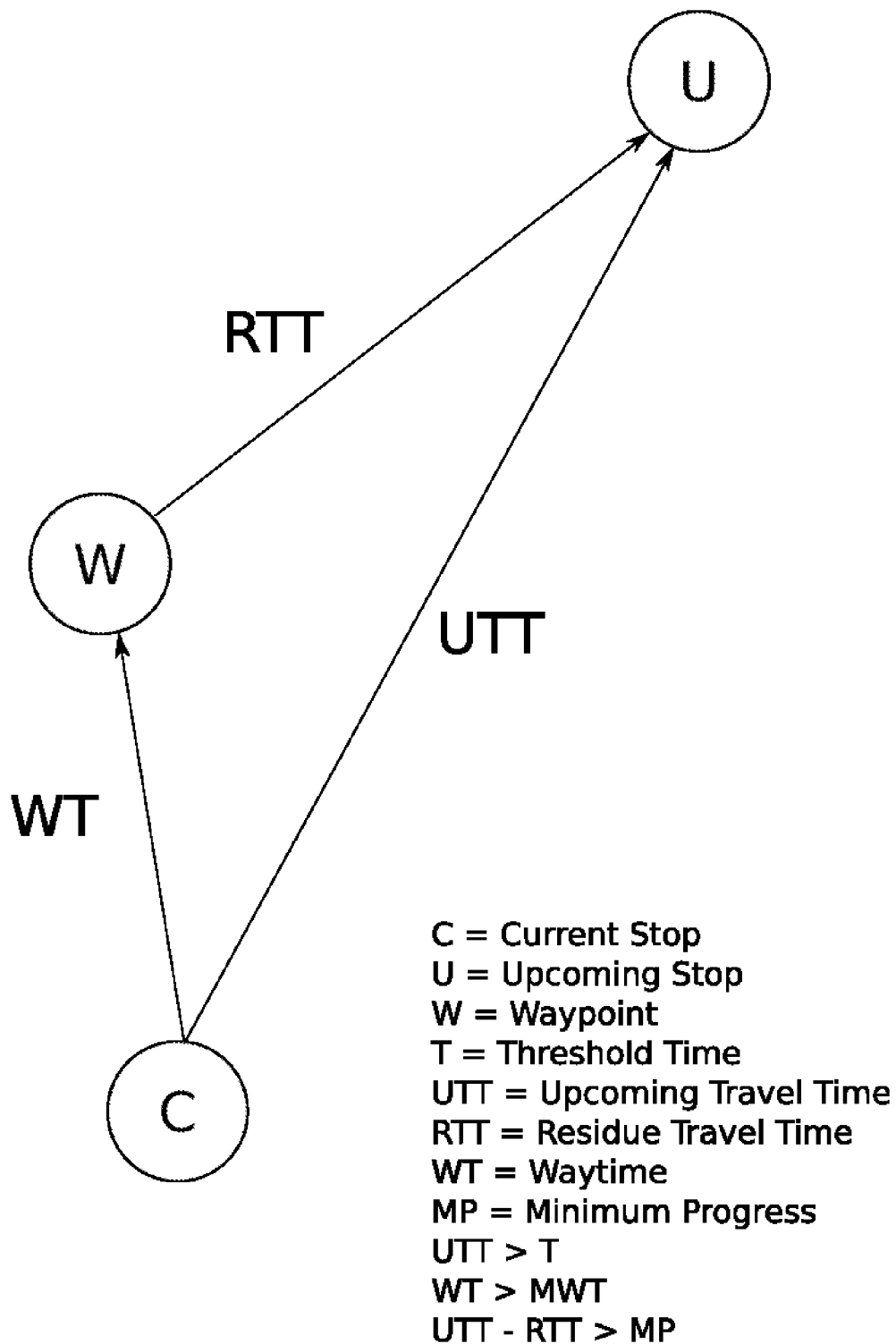
FIG. 4 is a diagrammatic illustration of routing a vehicle through a waypoint.

Referring now to FIG. 3 and FIG. 4, generation of a vehicle route 300 is illustrated. The vehicle route will be generated to service the service request and either initiate a direct route to the service request location or generate one or more intermediate stops at waypoints on the route to service such service request. The dynamically generated vehicle route is determined in accordance with the parameters:

a. Current Stop: the stop at which the vehicle is currently located, or the stop at which the vehicle will next arrive b. Upcoming Stop: the stop at which the routing component has previously determined the vehicle should stop subsequent to the current stop, based on all prior service requests.

c. Upcoming travel time: the approximated travel time for the vehicle to travel from the current stop to the upcoming stop, which can be determined by known methods d. Threshold time: the amount of upcoming travel time over which the administrator desires the vehicle makes an intermediate stop at a waypoint on the way to the upcoming stop e. Hub stop: a stop that may be selected as a waypoint, determined by the administrator who may consider various factors which may include safety, room for the vehicle to stop and wait, etc.

f. Waypoint: an intermediate stop, selected from amongst the hub stops, between the current stop and the upcoming stop as selected by the routing component g. Waytime: the approximated travel time for the vehicle to travel from the current stop to each hubstop being evaluated by the routing component as a potential waypoint h. Minimum allowed waytime: the amount of waytime under which the administrator considers it undesirable to select such hub stop as the waypoint i. Residue travel time: the approximated travel time between a candidate hub stop and the upcoming stop j. Minimum progress: the difference between the upcoming travel time and residue travel time under which the administrator considers it undesirable to select such hub stop as the waypoint Preferably, either at a predetermined frequency or continuously, or less preferably only upon the receipt of the service request, at block 302 the routing component re-evaluates the service requests, cancellation of service requests and other information at its disposal and then prepares a provisional vehicle route from the current stop directly to the upcoming stop in accordance with previously known techniques. The routing component then determines whether the upcoming stop in the provisional vehicle route will result in the upcoming travel time being longer than the threshold time. If not, then at block 304 the upcoming stop will be the next stop for the vehicle. However, if so, then the vehicle is routed to a waypoint. The waypoint to become the next stop is selected at block 306 by choosing one of the hub stops. The hubstops to evaluate as candidate hubstops can include all hubstops or a subset thereof. The waypoint is the hubstop in the intersection 308 of the following hub stop subsets: (a) the waytime exceeds the minimum allowed waytime, shown at block 310; (b) the minimum progress criterion is fulfilled, shown at block 312; (c) the waytime is under the threshold time, shown at block 314. The administrator may configure a decision criteria to enable the routing component to select as the waypoint one of the hub stops if more than one hub stop meets the above constraints. Such decision criteria may be, for example, selecting as the waypoint: the hub stop with the shortest waytime, the hub stop with the longest waytime, a hub stop chosen randomly (or pseudo-randomly), the hub stop that has the shortest travel time to the upcoming stop, the hub stop with the shortest combined waytime and residue travel time, or the hub stop with the longest combined waytime and residue travel time.

The waypoint then becomes the next stop and the vehicle route is adjusted to incorporate the waypoint accordingly at block 316. If no waypoint meets the above constraints, no adjustments to the route are made. Referring back to FIG. 2, if an adjustment is being made then at block 210 the routing component directs the dispatch system to transmit the route to the vehicle.

At any point the routing component can reevaluate the service requests to determine what stop to make the upcoming stop subsequent to the waypoint. Upon the vehicle arrival at a waypoint at block 212, the waypoint becomes the current stop. Thus, an iterative determination is made to route the vehicle such that all service requests and changes to such service requests are configured through potentially zero, or one or more, waypoints.

In essence, the routing component is dynamically generating a route to best ensure that a vehicle is not required to drive without a stop for longer than a predetermined time. The benefits of such an approach are at least that: (a) if the service request that caused the route alteration is cancelled while the vehicle is travelling to the upcoming stop, the vehicle does not need to drive the entire distance to that stop but only a portion of it to the hub stop; and (b) if additional service requests are created while the vehicle is travelling, the vehicle route may be more easily adjusted.

In an embodiment, the routing component may permit service requests made to locations that are not possible stops. In such cases, the vehicle may be routed to a location chosen by the routing component, and the passenger may be directed to await the vehicle at that location. The routing component achieves this by first resolving the service request location to possible stops nearby and performing the method described above using this location as the upcoming stop.

In an embodiment, the routing component may permit service requests from a stop but the routing component may choose another stop nearby for the purposes of grouping service requests together for the sake of efficiency or other operational considerations. The routing component achieves this by first resolving the service request location to possible stops nearby and performing the method described above using this location as the upcoming stop.

The present embodiments can be used for other examples and applications as appropriate. The system and method can be adapted to any suitable application in which a preconfigured route is desirable for a vehicle but where demand for such vehicle changes dynamically. For example, the system and method described herein are adaptable to courier services with no or minimal modification.

Although the invention has been described with reference to certain specific embodiments, various modifications thereof will be apparent to those skilled in the art without departing from the spirit and scope of the invention as outlined in the claims appended hereto.

The invention claimed is:

1. A computer implemented method for routing a vehicle, comprising:
   establishing, in a non-transitory computer memory, a set of parameters comprising a plurality of hub stops and a threshold time;
   receiving a service request comprising a service location;
   determining a current location of the vehicle;
   determining an upcoming travel time for the vehicle to travel from the current location to the service location; and
   determining, via a routing component comprising a processor, a next stop for the vehicle selected from:
      if the upcoming travel time does not exceed the threshold time, the service location; and
      if the upcoming travel time exceeds the threshold time, an intermediate stop on route to the service location selected from one of the plurality of hub stops, wherein the routing component retains the service location as a stop to be made subsequent to travelling to the intermediate stop.

2. The method of claim 1, wherein the set of parameters further comprises a minimum allowed waytime and a minimum progress time, and wherein selecting one of the plurality of hub stops comprises:
   generating a first subset of hub stops for which travel time from the current location to the respective hub stop is greater than the minimum allowed waytime;
   determining a residue travel time for each of the plurality of hub stops, the respective residue travel time being travel time between the respective hub stop and the service location;
   generating a second subset of hub stops for which the difference between upcoming travel time and residue travel time is greater than the minimum progress time;
   generating a third subset of hub stops for which travel time from the current location of the vehicle to each respective hub stop is less than the threshold time; and
   selecting a hub stop occurring within each one of the first subset, second subset and third subset.

3. The method of claim 2, wherein if more than one of the plurality of hub stops occurs within each one of the first subset, second subset and third subset, selecting one of the plurality of hub stops further comprises selecting the hub stop having the least travel time for travelling from the current location to the respective hub stop.

4. The method of claim 2, wherein if more than one of the plurality of hub stops occurs within each one of the first subset, second subset and third subset, selecting one of the plurality of hub stops further comprises selecting the hub stop having the greatest travel time for travelling from the current location to the respective hub stop.

5. The method of claim 2, wherein if more than one of the plurality of hub stops occurs within each one of the first subset, second subset and third subset, selecting one of the plurality of hub stops further comprises selecting the hub stop randomly or pseudorandomly.

6. The method of claim 2, wherein if more than one of the plurality of hub stops occurs within each one of the first subset, second subset and third subset, selecting one of the plurality of hub stops further comprises selecting the hub stop having the least travel time from the respective hub stop to the service location.

7. The method of claim 2, wherein if more than one of the plurality of hub stops occurs within each one of the first subset, second subset and third subset, selecting one of the plurality of hub stops further comprises selecting the hub stop with the shortest combined travel time from the current location to a respective hub stop, and from the respective hub stop to the service location.

8. The method of claim 2, wherein if more than one of the plurality of hub stops occurs within each one of the first subset, second subset and third subset, selecting one of the plurality of hub stops further comprises selecting the hub stop with the greatest combined travel time from the current location to a respective hub stop, and from the respective hub stop to the service location.

9. The method of claim 1, wherein the service request further comprises a requested time to service the service location, the requested time being contemporaneous with receiving the service request.

10. The method of claim 1, wherein the service request further comprises a requested time to service the service location, the requested time being in the future relative to receiving the service request.

11. The method of claim 10, wherein the routing component periodically evaluates the service request until such time as servicing the service request results in a route arriving at the service location at approximately the requested time.

12. The method of claim 1, wherein the service location is a pickup location and the service request further comprises a dropoff location and a pickup time.

13. The method of claim 1, wherein the service location is a dropoff location and the service request further comprises a pickup location and a dropoff time.

14. The method of claim 1, wherein the service request is provided via a service requesting device.

15. The method of claim 14, wherein the service requesting device is a mobile device operated by a requesting passenger.

16. The method of claim 1, wherein upon a cancellation of the service request, the routing component directs the vehicle to continue to the next stop, removes the service location from the vehicle's route and thereafter reroutes the vehicle based on additional service requests.

* * * * *